United States Patent
Lam et al.

(10) Patent No.: US 8,903,366 B2
(45) Date of Patent: Dec. 2, 2014

(54) DYNAMIC SWITCHING BETWEEN SOFTWARE AND HARDWARE GRAPHICS RENDERING FOR POWER CONSUMPTION

(75) Inventors: Ioi Kim Lam, Mountain View, CA (US); Bing Xia, Fremont, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 247 days.

(21) Appl. No.: 12/714,743

(22) Filed: Mar. 1, 2010

(65) Prior Publication Data

US 2011/0212715 A1 Sep. 1, 2011

(51) Int. Cl.
*H04M 3/00* (2006.01)
*G06F 1/32* (2006.01)

(52) U.S. Cl.
CPC ............ *G06F 1/3203* (2013.01); *G06F 1/3287* (2013.01); *Y02B 60/1292* (2013.01); *Y02B 60/1282* (2013.01)
USPC ........... 455/418; 713/320; 713/340; 345/502; 345/589

(58) Field of Classification Search
CPC .............................. G06F 1/3203; G06F 1/3287
USPC ............ 455/418; 345/502, 589; 713/320, 340
See application file for complete search history.

(56) References Cited

U.S. PATENT DOCUMENTS

| | | | |
|---|---|---|---|
| 6,850,240 B1 * | 2/2005 | Jones, Jr. | 345/503 |
| 7,434,076 B1 * | 10/2008 | Altounian et al. | 713/324 |
| 7,827,424 B2 * | 11/2010 | Bounitch | 713/322 |
| 2003/0128198 A1 * | 7/2003 | Mizuyabu et al. | 345/204 |
| 2007/0030244 A1 * | 2/2007 | Ishii | 345/107 |
| 2007/0283175 A1 * | 12/2007 | Marinkovic et al. | 713/320 |
| 2008/0034238 A1 * | 2/2008 | Hendry et al. | 713/323 |
| 2008/0055311 A1 * | 3/2008 | Aleksic et al. | 345/428 |
| 2008/0133956 A1 * | 6/2008 | Fadell | 713/340 |
| 2008/0141049 A1 * | 6/2008 | Hassan et al. | 713/320 |
| 2008/0168285 A1 * | 7/2008 | de Cesare et al. | 713/320 |
| 2009/0058872 A1 * | 3/2009 | Boettcher et al. | 345/589 |
| 2009/0079746 A1 * | 3/2009 | Howard et al. | 345/502 |
| 2009/0109230 A1 | 4/2009 | Miller et al. | |
| 2010/0007667 A1 * | 1/2010 | Kawata et al. | 345/502 |
| 2011/0193851 A1 * | 8/2011 | Lu et al. | 345/213 |

FOREIGN PATENT DOCUMENTS

WO    2007/140404 A2    12/2007

* cited by examiner

*Primary Examiner* — Qun Shen
(74) *Attorney, Agent, or Firm* — Jefferson IP Law, LLP (57) ABSTRACT

An apparatus and method for providing a user interface are provided. The method includes determining a status of the mobile terminal, and rendering a user interface using one of the software mode and the hardware mode based on the status of the mobile terminal. Accordingly, because a hardware mode provides a high quality user interface but requires more power as compared to the software mode, the mobile terminal is able to reduce power consumption by automatically switching to the software mode based on the status of the mobile terminal.

22 Claims, 5 Drawing Sheets

DYNAMIC SWITCHING BETWEEN SOFTWARE AND HARDWARE GRAPHICS RENDERING FOR POWER CONSUMPTION

BACKGROUND OF THE INVENTION

1. Field of the Invention

The present invention relates to an apparatus and method for rendering graphics. More particularly, the present invention relates to an apparatus and method for efficiently rendering graphics depending on various parameters.

2. Description of the Related Art

Mobile terminals were developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

Another feature of mobile terminals that has been improved with the advances in technology is the use of 2-Dimensional (2D) and 3-Dimensional (3D) displays. Many mobile terminals now include sophisticated 2D and 3D graphics accelerator hardware that can render high quality graphics at a very high speed. Use of such graphics accelerator hardware allows the mobile terminal to incorporate a complex user interface such as a 2D or 3D interface. For example, a mobile terminal may include a 2D or 3D interface that allows for an enhanced menu screen, the ability to play advanced games, and the like, thus enhancing the user's interaction with the mobile terminal.

However, while the 2D or 3D interface provides greater user convenience, the graphics accelerator hardware requires a significant amount of power to operate properly. Accordingly, if the graphics accelerator hardware is used extensively, the battery of the mobile terminal may require frequent recharging based on the increased power requirement. On the other hand, if it is desired to provide a longer battery life, a software module may be used to provide a 2D or 3D interface rather than dedicated graphics accelerator hardware. However, with the use of the software module, it becomes very difficult to provide an interface that greatly improves the user's interaction with the mobile terminal.

One proposed solution to address the problem of improving the user interface while reducing power consumption is the implementation of dynamic voltage scaling. With dynamic voltage scaling, the voltage supplied to the graphics hardware is increased or decreased depending upon various conditions. For example, if increased user interface performance is desired, the amount of voltage supplied to the graphics hardware is increased while a lesser amount of voltage is supplied if increased performance is not required. However, dynamic voltage scaling requires hardware modification which is difficult to implement and does not provide sufficient flexibility.

Accordingly, there is a need for an apparatus and method for providing an improved user interface while reducing power consumption in a mobile terminal.

SUMMARY OF THE INVENTION

An aspect of the present invention is to address at least the above-mentioned problems and/or disadvantages and to provide at least the advantages described below. Accordingly, an aspect of the present invention is to provide an apparatus and method for efficiently providing a user interface.

In accordance with an aspect of the present invention, a method for providing a user interface in a mobile terminal having a software mode and a hardware mode is provided. The method includes determining a status of the mobile terminal, and rendering a user interface using one of the software mode and the hardware mode based on the status of the mobile terminal.

In accordance with another aspect of the present invention, an apparatus for providing a user interface in a mobile terminal having a software mode and a hardware mode is provided. The apparatus includes a control unit for determining a status of the mobile terminal and for rendering a user interface using one of the software mode and the hardware mode based on the status of the mobile terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The following exemplary embodiments of the present invention are described as applied to a "mobile terminal" However, it is to be understood that this is merely a generic term and that the invention is equally applicable to any of a mobile phone, a palm sized Personal Computer (PC), a Personal Digital Assistant (PDA), a Hand-held PC (HPC), a smart phone, an International Mobile Telecommunication 2000 (IMT-2000) terminal, a wireless Local Area Network (LAN) terminal, and the like. Accordingly, use of the term "mobile terminal" should not be used to limit application of the present inventive concepts to any certain type of apparatus or device.

Exemplary embodiments of the present invention include an apparatus and method for efficiently rendering a user interface based on parameters of a mobile terminal. As will be described in more detail below, an exemplary mobile terminal exploits the fact that a user interface need not be supported by high speed dedicated hardware at all times in order to provide an acceptable display. By considering various parameters of the mobile terminal such as a power level, demands of an application, and information regarding a currently executed user interface, an exemplary implementation of the present invention is able to automatically select between a higher speed, high power hardware mode and a slower speed, lower power software mode to provide the user interface.

Figure 1:
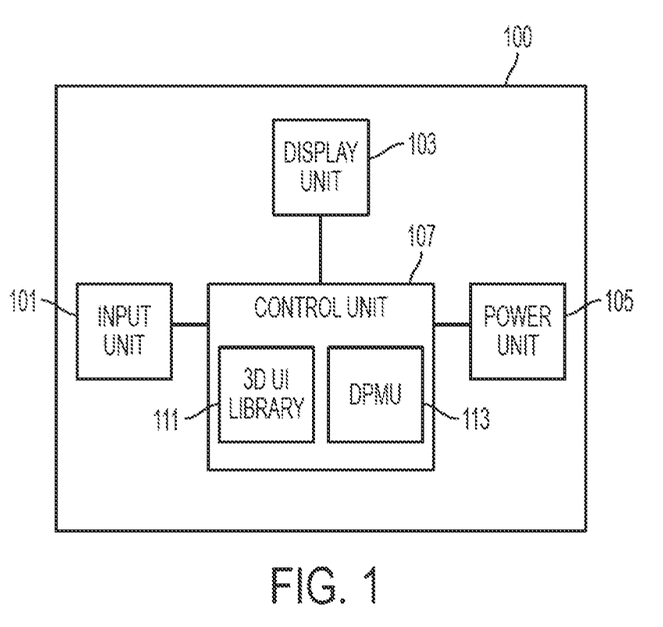
FIG. 1 is a block diagram illustrating a mobile terminal according to an exemplary embodiment of the present invention.

FIG. 1 is a block diagram illustrating a mobile terminal according to an exemplary embodiment of the present invention.

Referring to FIG. 1, a mobile terminal 100 includes an input unit 101, a display unit 103, a power unit 105, and a control unit 107.

The input unit 101 includes a plurality of alphanumeric keys that allow a user to select various inputs for manipulation of the mobile terminal. The input unit 101 may further include any of various soft keys, function keys, a menu button, a cancel button, a delete button, an OK button, a talk button, an end button, an Internet button, a navigation key button, a direction key button, a plurality of function keys such as a character input key, and the like. Also, the input unit 101 may include one or more touch sensors for providing user input. The input unit 101 provides input data corresponding, for example, to a key pressed by a user to the controller 107.

The display unit 103 displays a user interface including status information generated during operation of the mobile terminal, a limited number of letters, a moving image, still images, and the like. The display unit 103 may include a color Liquid Crystal Display (LCD). In this case, the display unit 103 may include a controller for controlling the LCD, a video memory in which image data is stored and an LCD element. If the LCD is provided as a touch screen, the display unit 103 may perform a part or all of the functions of the input unit 101.

The power unit 105 provides power to the control unit 107 for activating circuits included therein. In an exemplary implementation, the power unit 105 denotes a battery of the portable terminal. Furthermore, the power unit 105 includes circuitry for determining an amount of available power such as the battery voltage, and the like. Such information determined by the circuitry is provided to the controller 107. Furthermore, the power unit 105 is not limited to a battery and may further include a port for externally connecting an AC power adaptor as well as circuitry for regulating the external power, and the like.

The control unit 107 performs processing and control for general operations of the mobile communication terminal. For example, the control unit 107 performs processing and control for voice telephony and data communication. Furthermore, according to an exemplary embodiment of the present invention, the control unit 107 controls the provision of a user interface in one of a hardware mode and a software mode. The control unit 107 includes a 3-Dimensional User Interface (3D UI) Library 111 and a Dynamic Power Management Unit (DPMU) 113. The 3D UI Library 111 and the DPMU 113 will be explained in more detail below.

Figure 2:
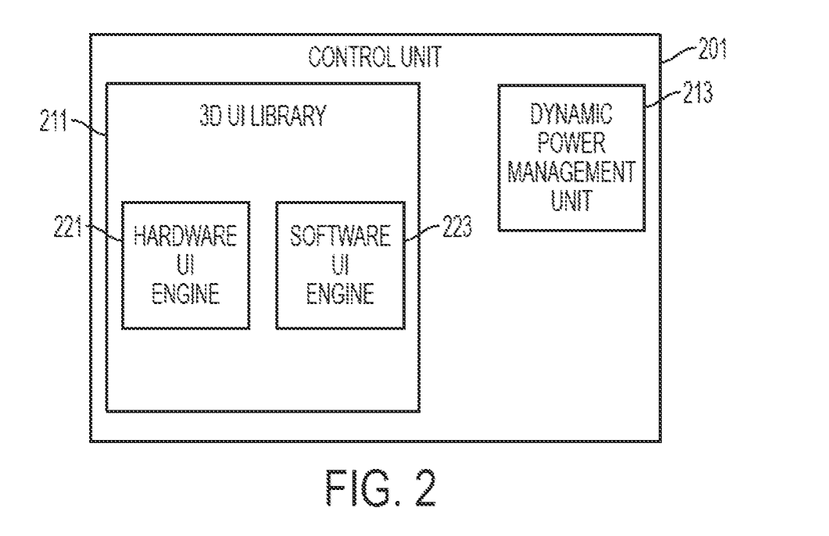
FIG. 2 is a block diagram illustrating a control unit according to an exemplary embodiment of the present invention.

FIG. 2 is a block diagram illustrating a control unit according to an exemplary embodiment of the present invention.

Referring to FIG. 2, the control unit 201 includes a 3D UI Library 211 and a DPMU 213. The 3D UI Library 211 includes Application Programming Interfaces (APIs) that allow the various applications run by the mobile terminal to render a user interface. For example, the 3D UI Library 211 includes APIs to interact with a music player, a video player, a phonebook, and other applications that are run by the mobile terminal. The 3D UI Library 211 is based on an Open Graphics Library/Embedded System (GL/ES) which provides for full-function 2D and 3D graphics on embedded systems. More specifically, OpenGL/ES consists of subsets of desktop OpenGL, and provides a flexible and powerful low-level interface between software and graphics acceleration.

The 3D UI Library 211 runs in one of two operation modes. The first mode is a hardware mode in which the 3D UI Library 211 renders a user interface using 3D acceleration hardware. In the hardware mode using the 3D acceleration hardware, a user interface can be provided at a higher speed but requires additional power to support the acceleration hardware. The second mode is a software mode in which the 3D UI Library 211 renders the user interface using software routines. In the software mode, the user interface cannot be provided as quickly as with the acceleration hardware. However, in the software mode, the acceleration hardware can be powered off to reduce power usage and thus reduce the frequency of battery recharging.

To support the hardware and software modes, the 3D UI Library 211 respectively includes a Hardware (HW) UI Engine 221 and a Software (SW) UI Engine 223. The HW UI Engine 221 provides dedicated hardware for rendering a 2D or 3D graphical interface. The HW UI Engine 221 renders a user interface at a high speed but requires additional power. The SW UI Engine 223 also renders a 2D or 3D graphical interface. However, and in contrast to the HW UI Engine 221, the SW UI Engine 223 renders a user interface at a slower speed than the HW UI Engine 221 but does not require the additional power necessary for the HW UI Engine 223.

Based on their respective speed capabilities and power requirements, the mobile terminal is able to automatically select one of the HW UI Engine 221 and the SW UI Engine 223 for rendering a graphical interface. That is, as will be explained in more detail below, the HW UI Engine 221 and SW UI Engine 223 are automatically selected by the 3D UI Library 211 depending on various system parameters.

The DPMU 213 is provided to receive the various system parameters as input and to determine which of the HW UI Engine 221 and SW UI Engine 223 should be used to provide a user interface based on the received input. That is, the DPMU 213 dynamically switches between the HW UI Engine 221 and SW UI Engine 223 based on the received input. In an exemplary implementation, the DPMU 213 receives information regarding an application that is executed by the mobile terminal, statistical information regarding the user interface, and information regarding the amount of available power. Using the received information, the DPMU 213 determines which of the HW UI Engine 221 and SW UI Engine 223 should be used to provide the user interface.

For example, the DPMU 213 may receive input that the mobile terminal is executing a music player application. In this case, the input received by the DPMU 213 may include information regarding an update frequency of a user interface based on the status of the music player application. For example, if the music player is in a status in which it is displaying various albums from which a user may make a selection, its update frequency may be higher than in a status in which it is playing back a selected file. More specifically, the music player may include a file selection function in which the UI visually illustrates a plurality of album covers and allows a user to scroll through the album covers by means of a touch screen. Accordingly, during the selection function, the update frequency of the user interface is increased. Conversely, in a music playback function, the music player application may statically illustrate a single album cover, corresponding to the file being played, a playback timer, as well as various control keys such as a stop key, a pause key, a next track key, and the like. Accordingly, in the playback function, the update frequency of the user interface is decreased. The DPMU 213 includes an API so that the application, in this case the music player application, can provide the information regarding the update frequency of the user interface. Using the received input of how often the application needs to update the user interface, the DPMU 213 automatically selects one of the HW UI Engine 221 and the SW UI Engine 223. Because the HW UI Engine 221 is able to more quickly update the user interface, if the DPMU 213 receives input that the user interface requires a higher update frequency, the DPMU 213 will select the HW UI Engine 221, depending on other system parameters. On the other hand, if the DPMU 213 receives input that the user interface does not require a higher update frequency, the DPMU 213 will select the SW UI Engine 223.

The DPMU 213 may also receive information regarding current operating parameters of the user interface. More specifically, the DPMU 213 may receive information, such as statistical information, regarding the user interface update frequency. If, based on the received information, the DPMU 213 determines that the user interface update frequency falls below a threshold, the DPMU 213 may select the SW UI Engine 223 for providing the user interface. On the other hand, if the DPMU 213 determines that the user interface update frequency is above the threshold, the DPMU 213 may select the HW UI Engine 221 for providing the user interface.

Furthermore, the DPMU 213 may receive input regarding the amount of available power from a power unit. For example, the DPMU may receive information regarding the voltage level available from a battery of the power unit. In that case, the DPMU 213 may determine if the available voltage is below a power threshold. If the DPMU 213 determines that the available power is below the power threshold, the DPMU 213 may select the SW UI Engine 223 for providing the UI. On the other hand, if the DPMU 213 determines that the available power is above the power threshold, the DPMU 213 may select the HW UI Engine 221 for providing the UI.

Figure 3A:
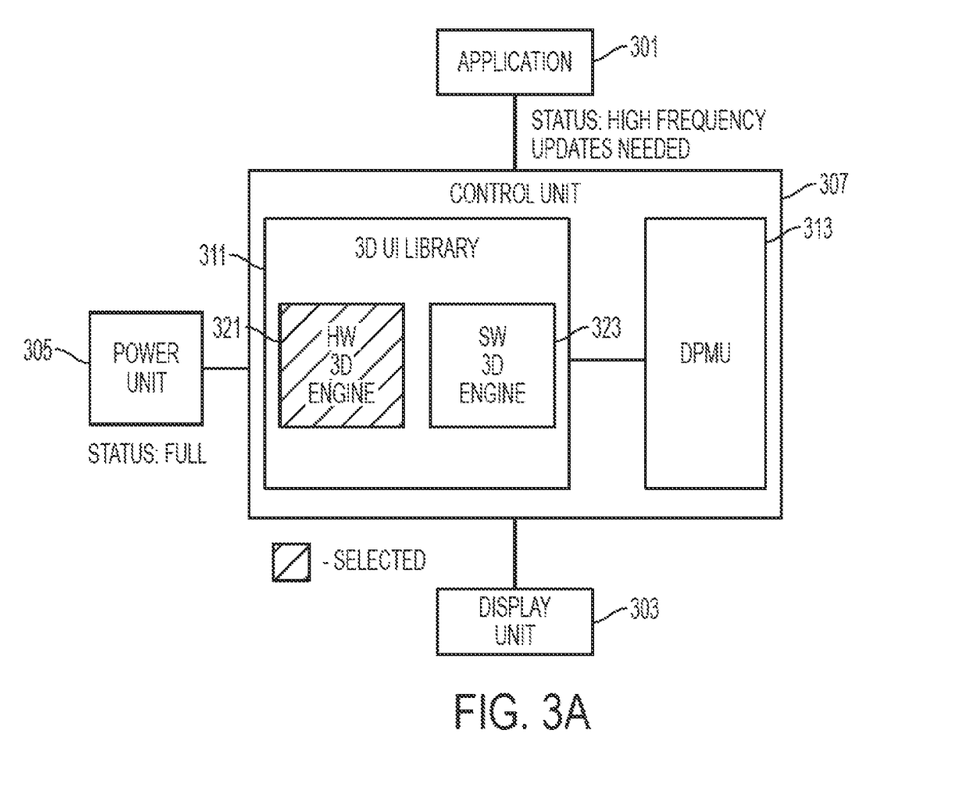
FIGS. 3A, 3B and 3C illustrate operating conditions of a mobile terminal according to exemplary embodiments of the present invention.
Figure 3B:
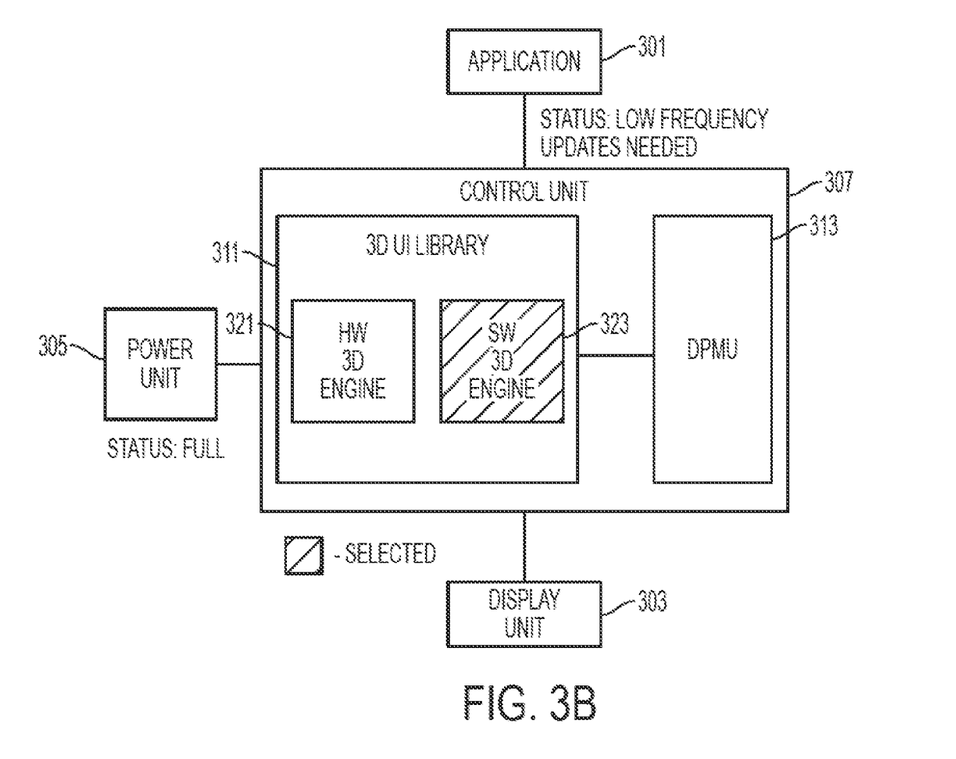
Figure 3C:
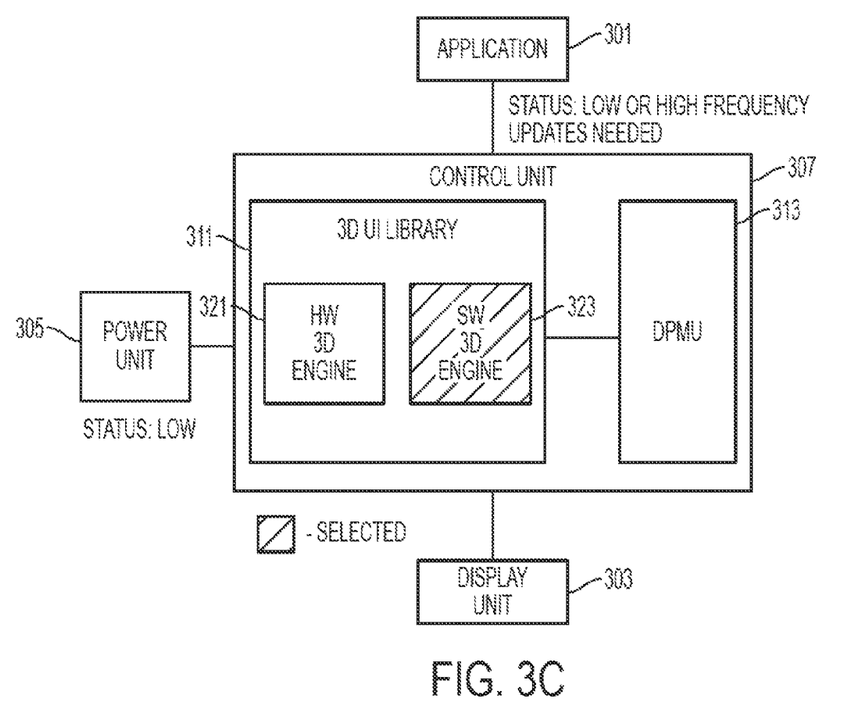

FIGS. 3A, 3B and 3C illustrate operating conditions of a mobile terminal according to exemplary embodiments of the present invention.

In each of FIGS. 3A, 3B and 3C, the mobile terminal includes an application 301, a display unit 303, a power unit 305 and a control unit 307. As described above, the control unit 307 further includes a 3D UI Library 311 and a DPMU 313, and the 3D UI Library 311 includes an HW 3D Engine 321 and a SW 3D Engine 323.

The application 301 may include any of a plurality of applications executable by the mobile terminal at the selection of a user. For example, the application may include a music player as described above, a phone book function, a messaging function, an Internet function, a function downloaded by the user, and the like. Generally, the application 301 provides an output to the control unit in order to render an appropriate image. The remaining components of FIGS. 3A-3C have been described above with reference to FIGS. 1 and 2 and will not be described again for sake of convenience.

Referring to FIG. 3A, application 301 is in a condition in which it requires a high frequency of updates in order to render a desired user interface. For example, if application 301 corresponds to a music player application, it may be in a condition in which a user is able to select an album for playing. In that situation, the music player application may display a plurality of album covers on display unit 303 and provide the user with the ability to quickly scroll through the album covers in order to select a desired album. Thus, the application would require a high frequency update in order to adequately display the plurality of album covers as part of the user interface. The application 301 provides this information to the DPMU 313 through its connection to the control unit 307.

As also illustrated in FIG. 3A, the power unit 305 is in a "Full" status. In that condition, the power unit 305 is able to not only supply adequate power to the control unit 307 for general operations of the mobile terminal, but also able to supply adequate power to the HW 3D Engine 321. The "Full" status may include conditions in which the battery of the power unit 305 is fully charged, the voltage of the battery of the power unit 305 is above a threshold, or the power unit 305 is connected to an external power source. If the "Full" status corresponds to a threshold voltage of the battery, the threshold may include a threshold that is initially set by the manufacturer, or a threshold that is set by a user. The power unit 305 provides this information to the DPMU 313 through its connection to the control unit 307.

The DPMU 313 also receives information from the 3D UI Library 311. More specifically, the DPMU 313 receives information regarding parameters of a currently executed user interface. For example, the DPMU 313 may receive information regarding the update frequency of a user interface currently being provided. Based on the received information, the DPMU 313 determines which of the HW 3D Engine 321 and SW 3D Engine 323 to select for providing the user interface. That is, if the DPUM 313 determines that the user interface update frequency falls below a threshold, the DPMU 313 may select the SW UI Engine 323 for providing the user interface. On the other hand, if the DPMU 313 determines that the user interface update frequency is above the threshold, the DPMU 313 may select the HW UI Engine 321 for providing the user interface.

As illustrated in FIG. 3A, because the DPMU 313 receives information that the power unit 305 has a "Full" status and that the application 301 requires a high frequency update, the DPMU 313 selects the HW 3D Engine 321 to render the user interface. Again, the HW 3D Engine 321 is able to render a user interface at a significantly faster speed than the SW 3D Engine 323. Accordingly, because the application 301 indicates there is a need for high frequency updates and because the power unit 305 indicates there is sufficient power to support not only the control unit 307 but also the HW 3D Engine, the DPMU 313 selects the HW 3D Engine 321.

Referring to FIG. 3B, application 301 is in a condition in which it does not require a high frequency update in order to render a desired user interface. For example, if application 301 corresponds to a music player application, it may be in a condition in which the user has selected an album for playing and a music file is currently being played. In that situation, the music player application may statically display the cover of the album selected by the user, function keys such as a stop key, a next track key, and the like, and a timer indicating information regarding the status of the file being played on the display unit 303. Thus, the application would require low frequency updates in order to properly display the corresponding data. The application 301 provides this information to the DPMU 313 through its connection to the control unit 307.

The DPMU 313 also receives information that the power unit 305 is in a "Full" status, as described above, and information from the 3D UI Library regarding status information of the user interface, such as an update frequency of the user interface.

As illustrated in FIG. 3B, although the DPMU 313 receives information that the power unit 305 has a "Full" status, the DPMU 313 selects the SW 3D Engine 323 to supply the user interface to the display unit 303. The DPMU 313 selects the SW 3D Engine 323 based on the information received from the application 301. More specifically, the DPMU 313 selects the SW 3D Engine 323 based on the information that the application 301 does not require a high frequency update for its user interface. In such a situation, the SW 3D Engine 323 is able to render an adequate user interface despite its slower rendering speed as compared to the HW 3D Engine 321. Accordingly, the SW 3D Engine 323 is able to provide an adequate user interface for user appreciation without expending power that would otherwise be needed to support the HW 3D Engine 321, thus reducing power consumed from the power unit 305 and reducing the frequency of battery recharging.

Referring to FIG. 3C, power unit 305 is in a condition in which its power level is "Low." For example, the voltage of the battery of the power unit 305 may be below a threshold set by the manufacturer or user, or the power unit 305 may be disconnected from an external power source. The power unit 305 provides this information to the DPMU 313 through its connection to the control unit 307.

Having received the information from the power unit 305 that its power level is "Low," the DPMU 313 will select the SW 3D Engine 323. That is, the DPMU 313 will select the SW 3D Engine 323 independent of the status of the application 301.

Although not illustrated in FIGS. 3A-3C, the DPMU 313 also receives information from the 3D UI Library 311 regarding a currently provided user interface. For example, the 3D UI Library 311 may provide statistical information such as an update frequency of a currently executed user interface to the DPMU 313. Based on the received information, the DPMU 313 may select one of the HW 3D Engine 321 and the SW 3D Engine 323. More specifically, if the DPMU 313 receives information that the update frequency of a currently executed user interface falls below a threshold, the DPMU 313 may select the SW 3D Engine 323 for providing the user interface. In that case, the DPMU 313 would select the SW 3D Engine 323 because of its ability to support the lower update frequency while requiring less power than that required by the HW 3D Engine 321. Of course, the DPMU 313 would also consider other information received from, for example, the power unit 305 or the application 301 as input for determining which of the HW 3D Engine 321 or SW 3D Engine 323 to select.

As an example, DPMU 313 may receive status information from the application 301 that it requires a high frequency update to support its user interface. The DPMU 313 may also receive status information from the power unit 305 that it is "Full." Based on these two pieces of received information, the DPMU 313 would select the HW 3D Engine 321 as discussed above with reference to the description of FIG. 3A. However, if, in a substantially same situation, the DPMU 313 also received information from the 3D UI Library 311 that the update frequency of a user interface currently being executed was below a threshold, the DPMU may select the SW 3D Engine 323 despite the request of the application 301 for a high frequency update and the "Full" status of the power unit 305. In such a situation, the DPMU 313 would dynamically switch from the HW 3D Engine 321 to the SW 3D Engine 323, thus reducing power consumed from the power unit 305 while adequately supporting the user interface.

Similarly, in a situation substantially the same as illustrated in FIG. 3B, if the DPMU 313 received information from the 3D UI Library 311 that the update frequency of a currently executed user interface was above a threshold, the DPMU 313 would select the HW 3D Engine 311 to provide a faster rendering of the user interface. The DPMU 313 would switch from the SW 3D Engine 323 to the HW 3D Engine 321 despite information received from the application 301 that a user interface having low frequency updates was required.

Finally, if, as illustrated in FIG. 3C, the DPMU 313 receives input that the power unit 305 has a "Low" status, the DPMU 313 will continue use of the SW 3D Engine 323 regardless of any input received from the 3D UI Library 311 indicating that the update frequency of a currently executed user interface is above a threshold.

As discussed above, the "Full" status of the power unit 305 may be based on a threshold set by a manufacturer or a user. Furthermore, in an exemplary implementation, the control unit 307 may provide an option to select the HW 3D Engine 321 despite the "Low" status of the power unit 305. Such an option may be presented to the user when the battery voltage of the power unit 305 falls below a power threshold, when the power unit 305 is disconnected from an external power source, when the mobile terminal is first powered on, and the like.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for providing a user interface in a mobile terminal having a software mode in which a graphics acceleration hardware device is powered off and a hardware mode in which the graphics acceleration hardware is powered on, the method comprising:

determining an amount of available power;
determining an application to be executed by the mobile terminal;
determining a status of a user interface executed by the mobile terminal based on information received from a 3-Dimensional (3D) user interface library;

rendering the user interface using one of the software mode and the hardware mode based at least in part on the amount of available power, the status of the user interface executed by the mobile terminal, and the application to be executed by the mobile terminal; and displaying the rendered user interface on a display unit of the mobile terminal, wherein the amount of available power is of higher priority than the status of the user interface executed by the mobile terminal in determining whether to render the user interface using the software mode or the hardware mode, wherein the status of the user interface executed by the mobile terminal is of higher priority than the application to be executed by the mobile terminal in determining whether to render the user interface using the software mode or the hardware mode, and wherein the determining of the status of the user interface executed by the mobile terminal comprises determining a frequency of updates required by the user interface.

2. The method of claim 1, wherein the determining of the application to be executed by the mobile terminal comprises receiving information regarding an update frequency required by the application.

3. The method of claim 1, wherein the determining of the amount of available power comprises determining if at least one of a battery voltage is above a threshold and the mobile terminal is connected to an external power source.

4. The method of claim 1, wherein the rendering of the user interface using the software mode comprises rendering the user interface using one or more software routines.

5. The method of claim 4, wherein the one or more software routines are executed by a software engine.

6. The method of claim 1, wherein the rendering of the user interface using the hardware mode comprises rendering the user interface using graphic acceleration hardware.

7. The method of claim 1, wherein the rendering of the user interface using one of the software mode and the hardware mode comprises rendering the user interface using the software mode when the status of the user interface executed by the mobile terminal includes information that the user interface is being updated at a low frequency.

8. The method of claim 1, wherein the rendering of the user interface using one of the software mode and the hardware mode comprises rendering the user interface using the hardware mode when the user interface is being updated at a high frequency.

9. The method of claim 7, wherein the rendering of the user interface uses the software mode when the status of the user interface executed by the mobile terminal includes information that the user interface is being updated at a low frequency and at least one of the amount of available power is lower than a power threshold, and the application to be executed requires a low frequency update.

10. The method of claim 8, wherein the rendering of the user interface uses the hardware mode when status of the user interface executed by the mobile terminal includes information that the user interface is being updated at a high frequency and at least one of the amount of available power is greater than a power threshold, and at least one of the application to be executed requires a high frequency update.

11. The method of claim 1, wherein the determining of the application by the mobile terminal comprises determining an update frequency at which the corresponding user interface is updated.

12. An apparatus for providing a user interface in a mobile terminal having a software mode in which a graphics acceleration hardware device is powered off and a hardware mode in which the graphics acceleration hardware is powered on, the apparatus comprising:

a power unit configured to supply power to the mobile terminal and to provide information regarding an amount of available power;

an application to be executed by the mobile terminal; and a control unit configured to determine the amount of available power, to determine the application to be executed by the mobile terminal, to determine a status of a user interface executed by the mobile terminal based on information received from 3-Dimensional (3D) user interface library, and to render the user interface using one of the software mode and the hardware mode based at least in part on both the amount of available power, the status of the user interface executed by the mobile terminal, and the application to be executed by the mobile terminal, wherein the amount of available power is of higher priority than the status of the user interface executed by the mobile terminal in determining whether to render the user interface using the software mode or the hardware mode, wherein the status of the user interface executed by the mobile terminal is of higher priority than the application to be executed by the mobile terminal in determining whether to render the user interface using the software mode or the hardware mode, and wherein the control unit is further configured to determine the status of the user interface by at least determining a frequency of updates required by the user interface.

13. The apparatus of claim 12, wherein the control unit determines the application to be executed by the mobile terminal by receiving information regarding an update frequency required by the application.

14. The apparatus of claim 12, wherein the power unit comprises:

a battery; and a port for connection to an external power source, wherein the control unit determines the amount of available power by determining if at least one of the battery voltage is above a threshold and the mobile terminal is connected to the external power source.

15. The apparatus of claim 12, wherein the control unit renders the user interface using the software mode by rendering the user interface using one or more software routines.

16. The apparatus of claim 15, further comprising a software engine, wherein the one or more software routines are executed by the software engine.

17. The apparatus of claim 12, further comprising graphic acceleration hardware, wherein the control unit renders the user interface using the hardware mode by rendering the user interface using the graphic acceleration hardware.

18. The apparatus of claim 12, wherein the control unit renders the user interface using one of the software mode and the hardware mode by rendering the user interface using the software mode when the status of the user interface executed by the mobile terminal includes information that the user interface is being updated at a low frequency.

19. The apparatus of claim 12, wherein the control unit renders of the user interface using one of the software mode and the hardware mode comprises rendering the user interface using the hardware mode when the status of the user interface executed by the mobile terminal includes information that the user interface is being updated at a high frequency.

20. The apparatus of claim 12, wherein the control unit renders the user interface using one of the software mode and the hardware mode by rendering the user interface using the software mode when the user interface executed by the mobile terminal includes information that the user interface is being updated at a low frequency and at least one of the amount of available power is lower than a power threshold, the application to be executed requires a low frequency update.

21. The apparatus of claim 12, wherein the control unit renders of the user interface using one of the software mode and the hardware mode comprises rendering the user interface using the hardware mode when the status of the user interface executed by the mobile terminal includes information that the user interface is being updated at a high frequency and at least one of the amount of available power is greater than a power threshold, and at least one of the application to be executed requires a high frequency update.

22. The apparatus of claim 12, wherein the control unit determines the application to be executed by the mobile terminal by determining an update frequency at which the corresponding user interface is updated.

* * * * *